Jan. 13, 1959 F. G. SPLITT 2,868,873

SIGNAL SEPARATOR CIRCUIT FOR TELEVISION RECEIVERS

Filed Feb. 24, 1954

INVENTOR.
Frank G. Splitt

BY

J. D. Douglas
ATTORNEY 2,868,873
Patented Jan. 13, 1959

2,868,873

SIGNAL SEPARATOR CIRCUIT FOR TELEVISION RECEIVERS

Frank G. Splitt, Chicago, Ill., assignor to Admiral Corporation, Chicago, Ill., a corporation of Delaware Application February 24, 1954, Serial No. 412,176

2 Claims. (Cl. 178—7.3)

The present invention relates to a signal separator circuit for television receivers and more particularly to a synchronization signal separator circuit for television receivers in which noise elimination in the signal separator is dependent on the signal strength of a received carrier waves.

In prior television receiver synchronization systems various attempts have been made to eliminate noise pulses mixed in with the video signal. Noise pulses in the synchronization circuits appear as synchronization signals or in other instances, strong noise pulses cause a loss of synchronization signals due to over-loading of the circuit components. In either case, the picture is made unstable causing tearing and rolling due to improperly timed synchronization signal information or the loss of the synchronization signal.

In such systems it is desirable to obtain maximum noise immunity with a minimum loss of synchronization signal information. A satisfactory noise immunity circuit must be able to preserve the synchronization signal at all amplitudes while eliminating noise pulses exceeding the maximum excursion of the synchronization signal. The synchronization signal will vary in amplitude due to varying signal strength of the carrier. Prior systems have not been found suitable since they have not been able to retain the synchronization signals at varying amplitudes or have failed to eliminate sufficient noise to improve the synchronization signals.

It is, therefore, an object of the present invention to provide elimination of undesired signals.

Another object of the invention is the provision of efficient and effective elimination of undesired signals found in video signals.

A further object is to provide the elimination of noise in video signals without impairing the video signal.

Still another object of the invention is the provision of efficient and effective noise elimination in synchronization signals at all signal strengths.

With these and other objects in view, as will hereinafter more fully appear, and which will be more particularly pointed out in the appended claims, reference is now made to the following description taken in connection with the accompanying drawings in which:

Figure 1:
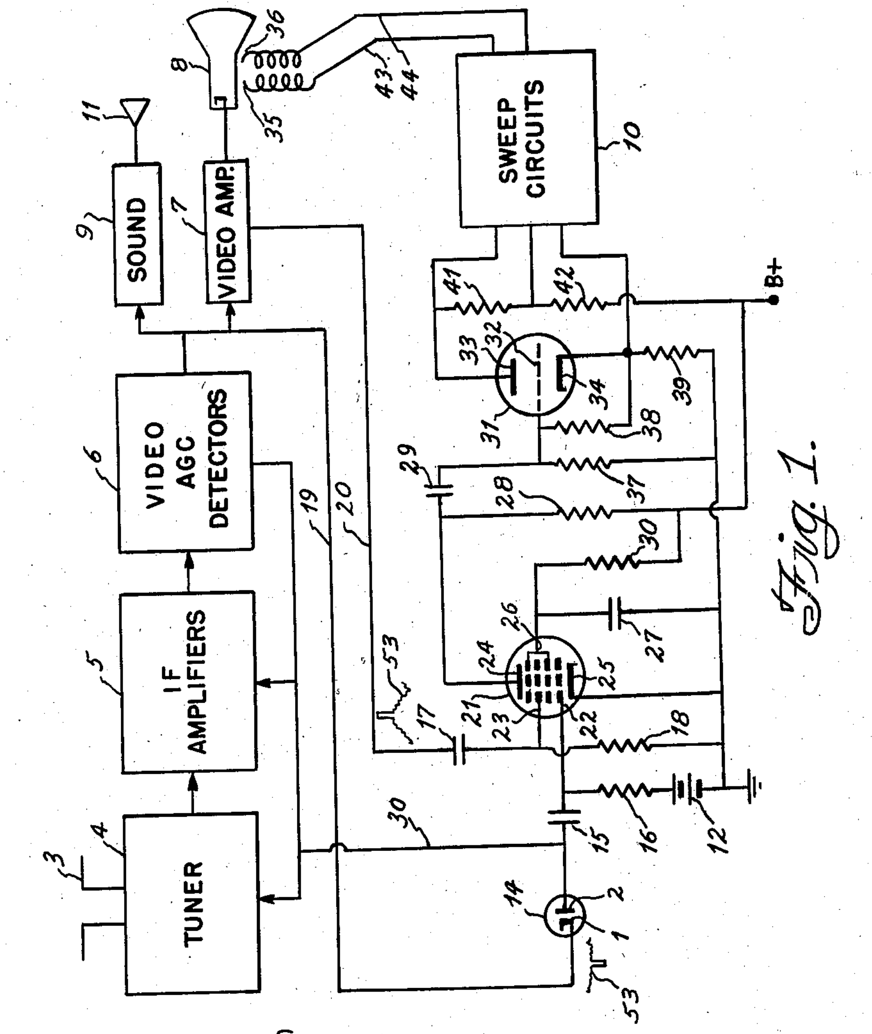
Fig. 1 is the circuit diagram shown partly in block diagram illustrating the noise immune synchronization signal separator of the invention.
Figure 2:
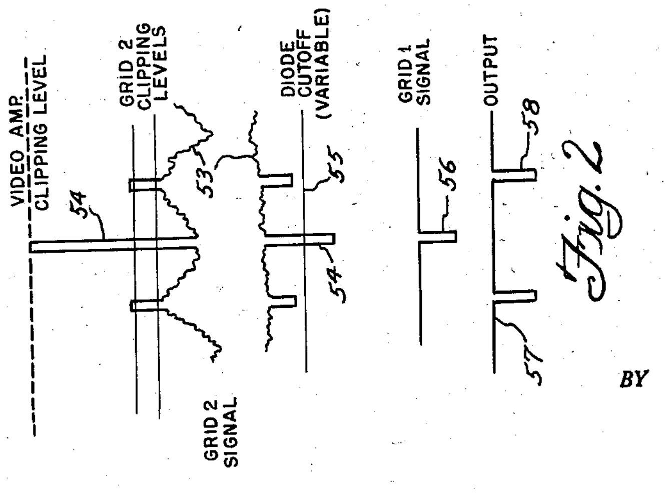
Fig. 2 shows the waveforms of certain signals in the synchronization signal separator circuit.

In practicing the invention, a television receiver is provided with the synchronization separator tube having dual control grids wherein the first control grid is used to block the tube in the presence of noise pulses and a second control grid functions with the remainder of the tube as synchronization signal separator. The first control grid is connected to the video detector by a gating diode which is biased to cutoff slightly above the peak amplitude of the negatively-going synchronization signal applied to its cathode by the varying negative AGC voltage applied to the plate. The noise pulses exceed the gating level causing the diode to conduct, applying a negative voltage to the first control grid of the synchronization separator tube, biasing the tube to cutoff. The synchronization signal separator tube, therefore, will operate in a conventional manner but will be noise immune due to the blocking action of the tube by the noise pulses applied to the first control grid.

Referring to the drawing, a circuit diagram of the television receiver of the superheterodyne type is shown with components shown in block diagram and certain other components shown in detail, which are necessary for the complete understanding of the invention. The antenna 3 is adapted to intercept modulated carrier signals for application to a radio frequency amplifier in the tuner 4 wherein the desired frequency signals are amplified.

The desired amplified signals are applied to a mixer and heterodyned with signals from the oscillator, both in the tuner section to produce an intermediate frequency signal, which signal is further selected and amplified in the intermediate frequency section 5. The video detector 6 thereupon derives the amplitude modulated video signal from the I. F. signal applied thereto. The video signal is then amplified in the amplifier 7 and applied to the kinescope in the conventional manner.

The receiver shown amplifies both the audio and video intermediate frequency signals in the I. F. section 5, the audio signals being heterodyned with the video signals in the detector 6. However, the receiver may be of any well-known type, e. g. receiver circuits wherein the audio signal is heterodyned and separated from the video signal before the I. F. stage. Referring back to the drawing, the audio beat signal is applied to the sound section 9, where the signal is amplified, detected, and reproduced in the speaker 11.

The automatic gain control voltage may be derived in the receiver in any well-known manner including gated AGC. The AGC voltage in this case is obtained by one of the most common methods; i. e. rectification of the video I. F. signals where a negative control voltage is derived, depending upon the strength of the received signal. This negative voltage is applied to the R. F. and I. F. stages to control the gain of the stages in the usual manner.

The synchronization signals are separated from the composite video signal derived from the video amplifier by the synchronization separator tube 21, and as shown in the drawings, the synchronization signals are applied to the control grid 32 of the phase inverter tube 31. The properly phased synchronization pulse signals derived from the tube 31 are subsequently applied to the vertical and horizontal signal separator circuits included in the sweep section 10. The sweep section 10 of the receiver is conventional and provides the necessary horizontal and vertical scanning voltage wave forms required for the horizontal and vertical deflection coils 35, 36, respectively, which are shown diagrammatically.

For the complete understanding of the invention, a detailed description of the structure of the synchronization separator and noise limiter circuitry is set forth subsequently. The synchronization separator and noise limiter circuit includes a tube 21, which may be of the dual control grid or pentagrid converter type, e. g. 6CS6, 6BE6, 6BA7. Negatively phased video signals are derived from the video detector 6 and applied to the control grid 22 via line 19, gating diode 14 and coupling condenser 15. The grid return resistor 16 and the low voltage source 12 provides a return path from the control grid 22 to the cathode 25 and ground. Positively phased video signals are obtained from the video amplifier 7 and are applied to the second control grid 23 of the tube 21 via line 20 coupling condenser 17; bias on the second control grid 23 is introduced by the signal current flow through grid leak resistor 18. The proper screen voltage is applied to the screen grid 26 from B+ through screen dropping resistor 30 which is bypassed to ground by screen bypass condenser 27; and the cathode 25 is operated at ground potential by a direct connection to ground and connected to the lower end of grid leak resistors 16, 18.

The plate 24 of tube 21 is connected to B+ through the load resistor 28 and to the control grid 32 of the phase inverter tube 31 by coupling condenser 29. The phase inverter tube 31 is maintained at the proper operating level for the negative synchronization signals taken from the plate of tube 21 by the grid leak resistors 37 and 38. The proper operating voltage on grid 32 is determined by the values of resistors 37, 38. A negative-going synchronization pulse signal voltage is developed across the cathode resistor 39 for application to the sweep section. The plate 33 of the phase inverter tube 31 is connected to resistors 41 and 42 to develop the horizontal and vertical synchronization signals across resistors 41, 42 for application to the sweep section 10, wherein the horizontal and vertical scanning signals are generated and applied to the vertical coil 35 and horizontal coil 36 through lines 43 and 44, respectively.

In operation, positively phased video signals 53, derived from the video amplifier 7, are applied to the second control grid 23 of tube 21. Control grid 23 is biased to cut off at negative synchronization signal clipping level by a large grid leak resistance 18, the video signal being of sufficient amplitude to drive this grid positive causing it to draw current and bias the tube 21 beyond cutoff slightly above pedestal level. Positive clipping is secured through the use of low screen voltage on screen grid 26 which lowers the saturation point of the tube, allowing the signal 53 on the second control grid to drive the tube to saturation. As a result of the clipping action of the separator tube, the synchronization signals are separated from the video signals applied to control grid 23.

The negatively phased video signals 53, derived from the video detector 6 are applied to the cathode 1 of a gating diode 14, driving the cathode thereof, negative relative to the anode of said diode. Diode 14 acts as a varying level gate, maintaining the gating level slightly above the varying maximum amplitude excursions of the video signals by applying a negative voltage, varying in amplitude directly with the varying maximum amplitude excursions of the video signals, to the plate 2. As used here, maximum amplitude excursions is intended to mean the varying amplitude level of the synchronization signal peaks due to changing strength of the received carrier wave. The diode 14, as a gate, is exemplary, obviously any gating means may be used where the amplitude level of the signal to be passed may be controlled, e. g. rectifiers, plural element electron tubes, and other signal translators.

As shown in the drawings, the automatic gain control voltage which may be gated AGC, is used to control the gating level. The AGC voltage provides a suitable source of negative voltage which varies in amplitude according to the strength of the received carrier wave on the video signal. Accordingly, when this AGC voltage is applied to the plate of diode 14, the level of conduction will be maintained at a level slightly above the varying strength video signal. All video signals including synchronization signals, except as pointed out hereafter, will be blocked by the gating diode 14.

The purposes in varying the level of gating is to obtain optimum detection of random signals or noise pulses which normally exceed the amplitude level of the video or synchronization signals at varying strength signal levels. Obviously, in order to detect all noise pulses exceeding the level of weak video signals, the level of gating of the diode 14 will necessarily be low. For strong video signals, this would not be a suitable gating level since the video signals would exceed the level of gating and a substantial portion of the stronger video signal would pass the gating diode along with the noise. In the same manner, a substantial part of noise pulses would not be detected upon raising the level of gating to the stronger signal level during reception of weak signals.

Random signals or noise pulses gated by the diode 14 are applied to the first control grid 22 of tube 21. The random signals or noise pulses are negative going and therefore drive the tube 21 to cutoff. As stated supra the video signals applied to the second control from the video amplifier are positive going. The random signals and noise pulses present in the video signals are applied to the second control grid 180° out of phase with the random signals and noise pulses on the first control grid. Since signals and pulses on the first control grid cut off the tube 21, the random signals and noise pulses will not appear in the output of the synchronization signal separator tube 21.

It is evident from the above action of the noise elimination circuit that if a noise pulse is superimposed on the synchronization signal, the circuit will eliminate both the noise and synchronization pulse; however, due to the relative length of synchronization pulses and intervals between pulses, such action is infrequent and would not affect horizontal oscillation in the sweep circuit, since the horizontal oscillator keeps in synchronization for a period over several synchronization pulses.

In comparison, noise pulses, although partially limited by the video amplifier, would draw current through the second control grid 23, charge up the coupling condenser 17 and cut off the synchronization separator 21, causing loss of synchronization after the noise pulse has ended; i. e. until the extra charge on the coupling condenser 17 has leaked off through relatively large resistor 18.

In strong television signal areas the composite video applied to the cathode of diode 14 has a high amplitude and the AGC voltage is high. Due to the high AGC voltage, the bias on the plate of the diode will be high, thus raising the gating level of the diode slightly higher than amplitude of the synchronization tip level.

In weak television signal areas little or no AGC voltage may be present in the receiver. The diode 14, therefore, will not be biased and will conduct upon receipt of the composite video signal 53 on its cathode. However, the amplitude of the signal on the second control grid 23 of tube 21 is much greater than that of the signal on the first control grid 22 applied from the diode 14 and the effect of the signal on the first control grid 22 is cancelled except upon receipt of a noise pulse which exceeds the synchronization peak level and drives the tube 21 to cutoff. The use of a low voltage source 12 biases the first control grid 22 to a level of cutoff slightly above synchronization peak level of video signals passing the gate 14.

The clipped synchronization pulses 58 are applied to the phase inverter tube 31 that acts primarily as a phase splitter to provide out-of-phase synchronization signals for the operation of the phase detector. Cathode load resistor 39 is not bypassed in order to provide a negative-going signal at the cathode for application to the phase detector. Since the signal applied to the grid 32 is negative, the signal on the plate 33 is positive-going and the signal developed across the vertical and horizontal load resistors 41 and 42 is positive, thereby providing the necessary synchronization signals for the sweep circuit in section 10.

It is seen from the above that a very simple synchronization signal separator circuit for automatic noise immunity is provided which requires relatively few additional components, but is very effective in improving the synchronization of the received television signal.

I claim:

1. In a television receiver having amplifier stages for amplifying the received signal, a video detector coupled to the output of said amplifier stages, a video amplifier coupled to the output of said video detector, automatic gain control means connected to vary the gain of said amplifier stages inversely with respect to the amplitude of the received signal, and a synchronization separator for recovering the synchronization signal portion from the remainder of the received signal, said synchronization separator including a signal translating device having a pair of control electrodes, the improvement which comprises: first coupling means coupling the output of the video amplifier to one of said control electrodes of said signal translating device in the synchronization separator for passing from the video amplifier to said one control electrode a signal of one sign; second coupling means coupling the output of the video detector to the other of said control electrodes for passing from the video detector a signal of the opposite sign, and means including a gate in said second coupling means for blocking said last-mentioned signal from said other control electrode except when the amplitude of said last-mentioned signal exceeds the gating level of the gate; and means coupling said automatic gain control means to the gate to control the gating level of the gate in accordance with the amplitude of the received signal so as to block signals having an amplitude not in excess of the amplitude of the synchronization signal portion of the received signal.

2. In a television receiver having successive radio frequency and intermediate frequency amplifier stages for amplifying the received signal, a video detector coupled to the output of the intermediate frequency amplifier stage, a video amplifier coupled to the output of said video detector, automatic gain control means connected to vary the gain of said amplifier stages inversely with respect to the amplitude of the received signal, and a synchronization separator for recovering the synchronization signal portion from the remainder of the received signal, said synchronization separator including an electron discharge tube having a cathode, an anode and a pair of control electrodes controlling the current through said tube, the improvement which comprises: first coupling means coupling the output of the video amplifier to one of said control electrodes of said tube in the synchronization separator for passing from the video amplifier to said one control electrode a signal of positive sign; means biasing said one control electrode negative with respect to the cathode of the tube to render the tube non-conductive except when said positive signal from the video amplifier exceeds a predetermined amplitude which is less than the amplitude of the synchronization signal portion of the received signal; second coupling means coupling the output of the video detector to the other of said control electrodes for passing from the video detector a signal of negative sign to render said tube non-conductive, and means including a gating diode in said second coupling means having its cathode coupled to the output of said video detector and its anode coupled to said other control electrode for blocking said negative signal from said other control electrode except when the amplitude of said negative signal exceeds the gating level of the diode; and means coupling said automatic gain control means to the anode of said diode to control the gating level of the diode in accordance with the amplitude of the received signal so as to block signals having an amplitude not in excess of the amplitude of the synchronization signal portion of the received signal.

References Cited in the file of this patent

UNITED STATES PATENTS

| | | |
|---|---|---|
| 2,265,883 | Applegarth | Dec. 9, 1941 |
| 2,339,857 | Holmes | Jan. 25, 1944 |
| 2,668,234 | Druz | Feb. 2, 1954 |

OTHER REFERENCES

Electronics, pages 124–127, April 1952.